United States Patent
Schilling et al.

(10) Patent No.: US 7,070,235 B2
(45) Date of Patent: Jul. 4, 2006

(54) CRASH-ACTIVE HEADREST

(75) Inventors: Jürgen Schilling, Kaiserslautern-Erlenbach (DE); Michael Böhmer, Rockenhausen (DE); Daniel Hippel, Winnweiler (DE); Darius Wrobel, Kaiserslautern (DE); Harald Klein, Matzenbach (DE); Georg Ruess, Oberarnbach (DE); Ali Peter Rihlmann, Kaiserslautern (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/037,926

(22) Filed: Jan. 18, 2005

(65) Prior Publication Data

US 2005/0127726 A1    Jun. 16, 2005

Related U.S. Application Data

(63) Continuation of application No. PCT/EP03/013757, filed on Dec. 5, 2003.

(30) Foreign Application Priority Data

Dec. 21, 2002  (DE)  ............................... 102 60 582
Nov. 4, 2003   (DE)  ............................... 103 51 367

(51) Int. Cl.
    *B60N 2/42*     (2006.01)

(52) U.S. Cl. ............................ 297/216.12; 297/216.14

(58) Field of Classification Search ............ 297/216.1, 297/216.12, 391, 406, 408, 409, 410, 216.14
See application file for complete search history.

(56) References Cited

U.S. PATENT DOCUMENTS

| 3,586,366 | A | | 6/1971 | Patrick |
| 3,838,870 | A | | 10/1974 | Hug |
| 4,511,180 | A | | 4/1985 | Klaus |
| 4,668,014 | A | | 5/1987 | Boisset |
| 4,720,146 | A | * | 1/1988 | Mawbey et al. ............ 297/409 |
| 5,011,225 | A | * | 4/1991 | Nemoto ...................... 297/408 |
| 5,290,091 | A | | 3/1994 | Dellanno et al. |

(Continued)

FOREIGN PATENT DOCUMENTS

DE          39 00 495 A1     7/1990

(Continued)

OTHER PUBLICATIONS

U.S. Appl. No. 10/727,867; filed Dec. 4, 2003; In re: Schafer et al., entitled *Head Restraint For A Vehicle Seat*.

*Primary Examiner*—Peter M. Cuomo
*Assistant Examiner*—Erika Garrett
(74) *Attorney, Agent, or Firm*—Womble Carlyle Sandridge & Rice, PLLC

(57) ABSTRACT

In a headrest (1) for a vehicle seat, having a carrier (5), at least one upper and lower linkage (11, 15) linked to the carrier (5), which can be pivoted around horizontal axles (7, 17), a impact element (13) linked to the linkages (11, 15) which forms at least one four-bar linkage (19) with the linkages (11, 15) and the carrier (5), and an energy storage device (25), the energy storage device (25) driving the four-bar linkage (19) in the event of a crash, so that the impact element (13) comes out forward from an original position into a crash position that is locked against a backward movement by a crash lock, the upper linkage (11) and the lower linkage (15) are unparallel with respect to one another.

54 Claims, 10 Drawing Sheets

U.S. PATENT DOCUMENTS

| | | | |
|---|---|---|---|
| 5,468,045 A * | 11/1995 | Weber | 297/216.11 |
| 5,738,412 A | 4/1998 | Aufrere et al. | |
| 5,820,211 A | 10/1998 | Heilig et al. | |
| 5,934,750 A | 8/1999 | Föhl | |
| 6,019,424 A * | 2/2000 | Ruckert et al. | 297/216.12 |
| 6,074,011 A | 6/2000 | Ptak et al. | |
| 6,079,776 A * | 6/2000 | Breitner et al. | 297/216.12 |
| 6,082,817 A | 7/2000 | Müller | |
| 6,088,640 A * | 7/2000 | Breed | 701/45 |
| 6,203,105 B1 | 3/2001 | Rhodes, Jr. | |
| 6,213,548 B1 | 4/2001 | Van Wynsberghe et al. | |
| 6,270,161 B1 | 8/2001 | De Filippo | |
| 6,478,373 B1 | 11/2002 | Hake et al. | |
| 6,623,073 B1 | 9/2003 | Schäfer et al. | |
| 6,688,697 B1 | 2/2004 | Baumann et al. | |
| 6,715,829 B1 * | 4/2004 | Svantesson et al. | 297/216.12 |
| 6,890,029 B1 * | 5/2005 | Svantesson | 297/216.12 |
| 2001/0040396 A1 | 11/2001 | Kreuels et al. | |
| 2004/0195872 A1 * | 10/2004 | Svantesson | 297/216.12 |
| 2005/0077762 A1 * | 4/2005 | Kraemer et al. | 297/216.12 |
| 2005/0116515 A1 * | 6/2005 | Schlierf et al. | 297/216.12 |
| 2006/0012226 A1 * | 1/2006 | Schafer et al. | 297/216.12 |

FOREIGN PATENT DOCUMENTS

| | | |
|---|---|---|
| DE | 296 03 467 U1 | 8/1996 |
| DE | 296 14 238 U | 12/1996 |
| DE | 197 07 998 A1 | 9/1998 |
| DE | 197 57 533 A1 | 10/1998 |
| DE | 299 07 245 U1 | 9/1999 |
| DE | 699 02 150 T2 | 6/2000 |
| DE | 199 51 966 A1 | 5/2001 |
| DE | 100 01 329 A1 | 7/2001 |
| DE | 100 04 766 A1 | 8/2001 |
| DE | 100 26 978 C1 | 10/2001 |
| DE | 100 47 406 A1 | 4/2002 |
| EP | 0 974 484 A2 | 1/2000 |
| EP | 0 976 608 A1 | 2/2000 |
| EP | 1 193 114 A1 | 4/2002 |
| JP | 10278648 A | 10/1998 |
| JP | 11321502 | 11/1999 |
| WO | WO 98/24652 A1 | 6/1998 |
| WO | WO 01/12465 A1 | 2/2001 |
| WO | WO 03/084777 | 10/2003 |

* cited by examiner

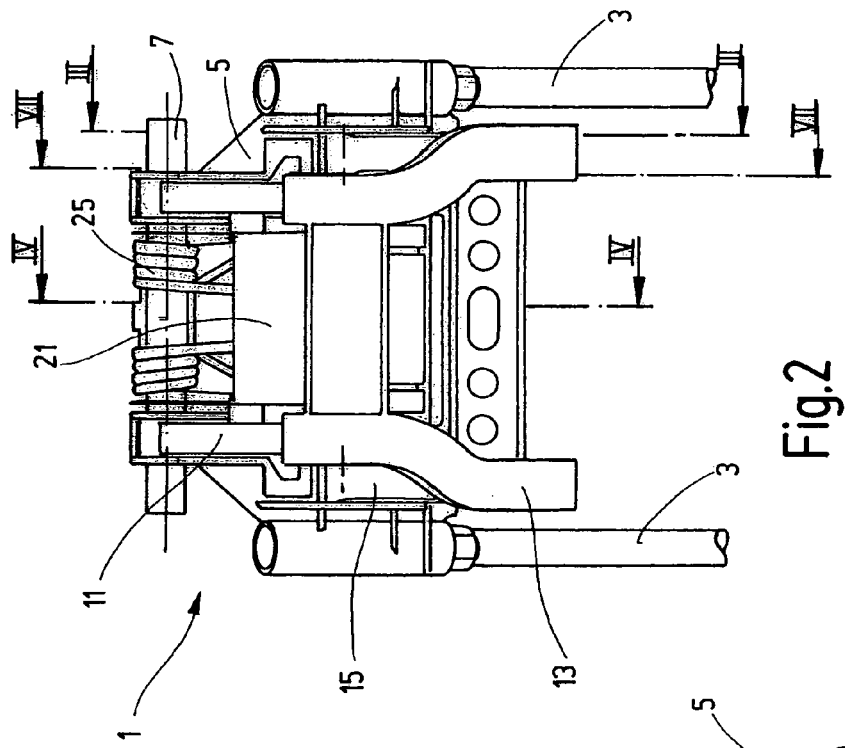
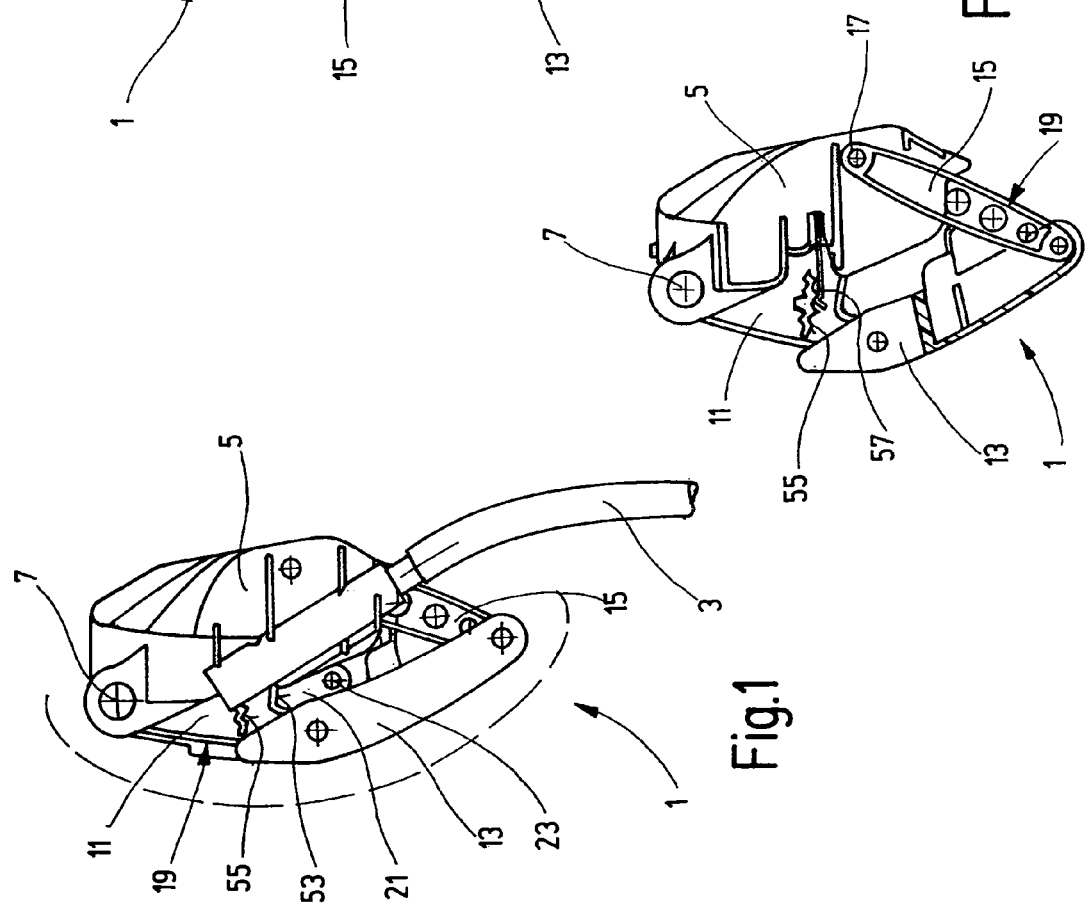

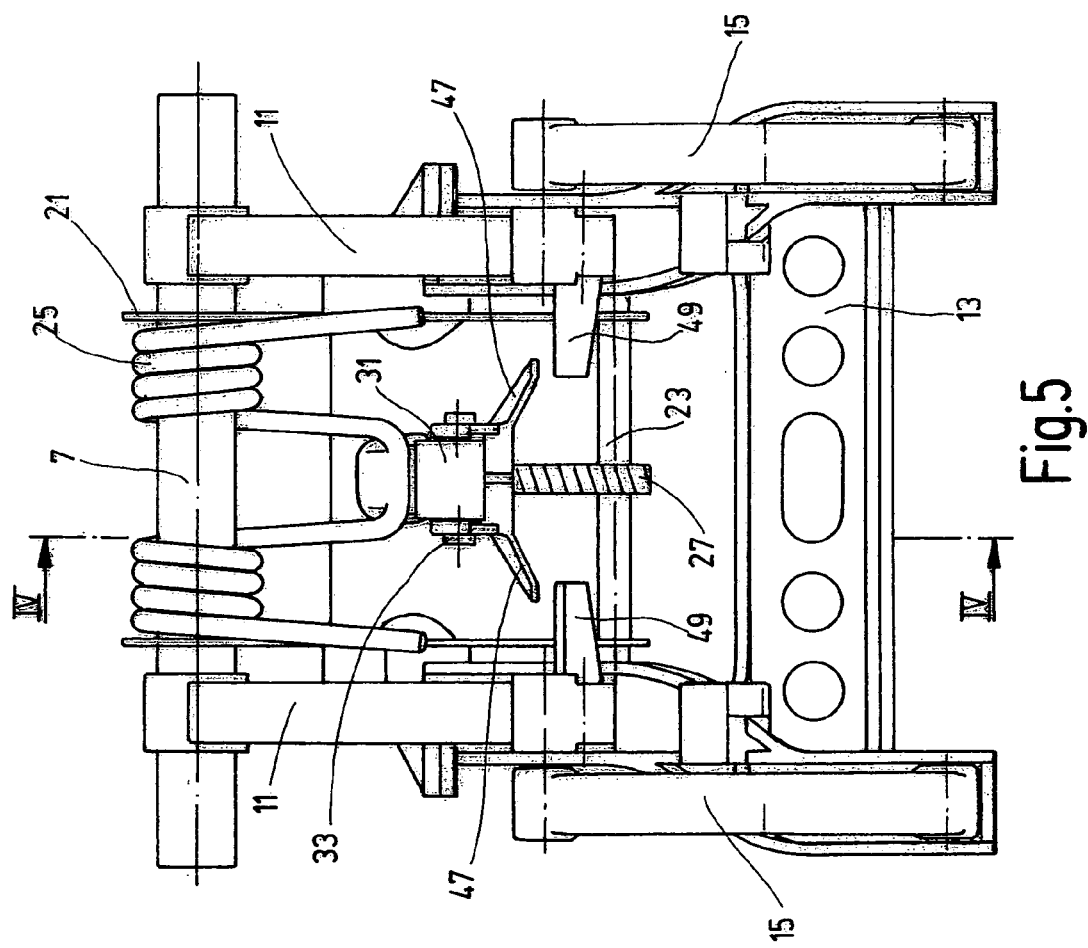
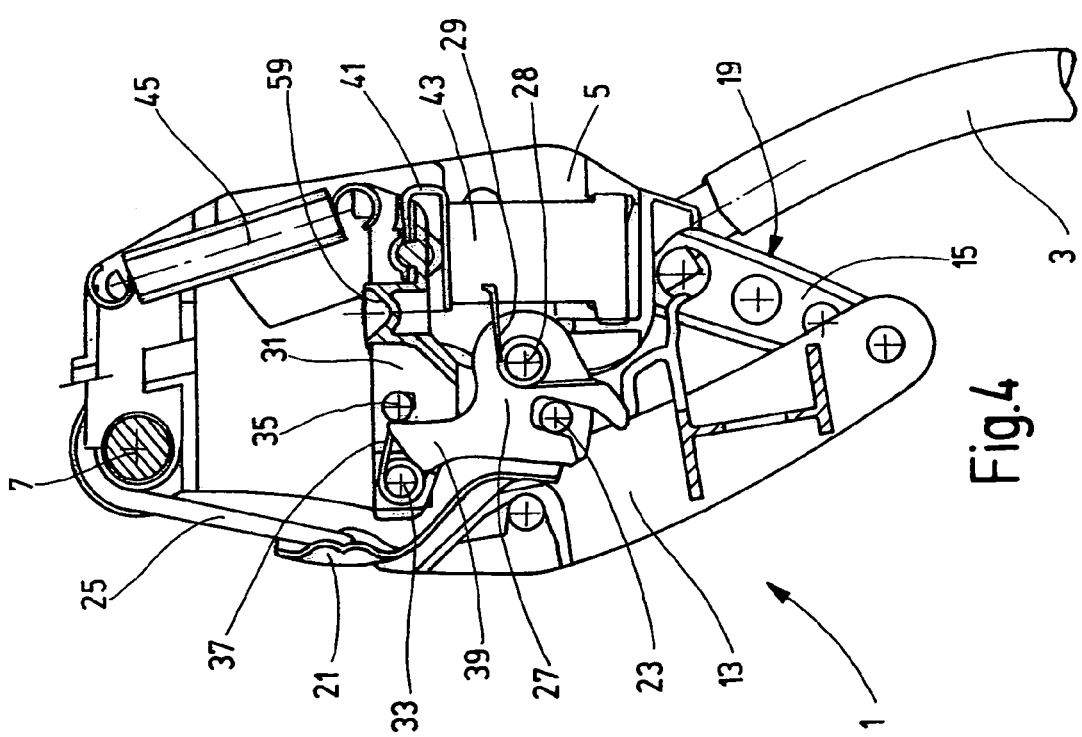

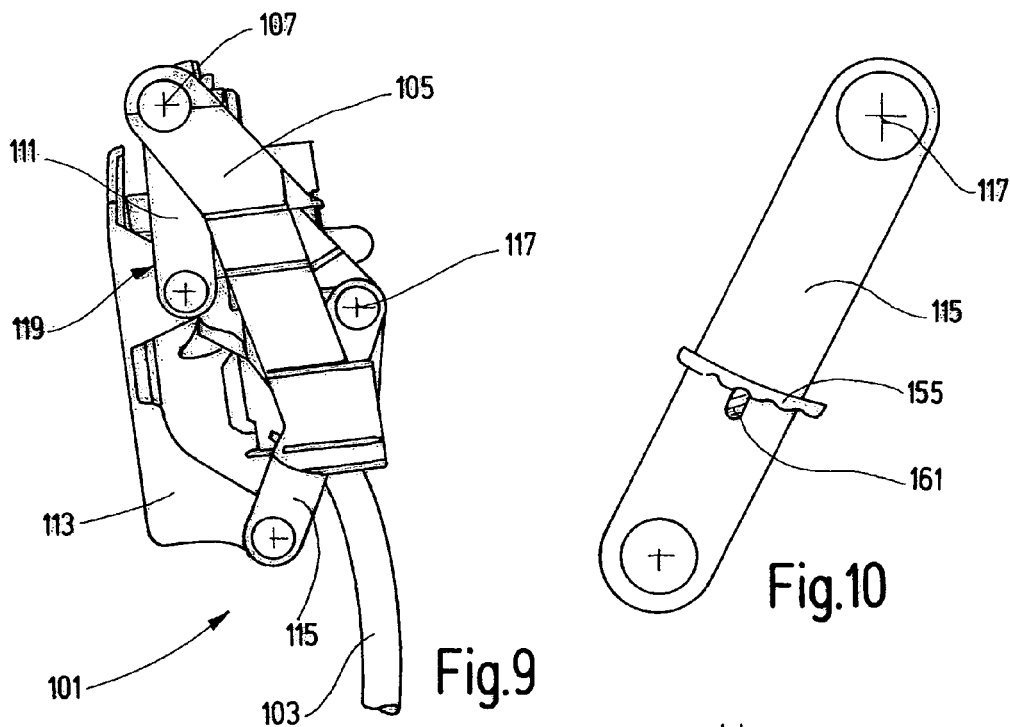
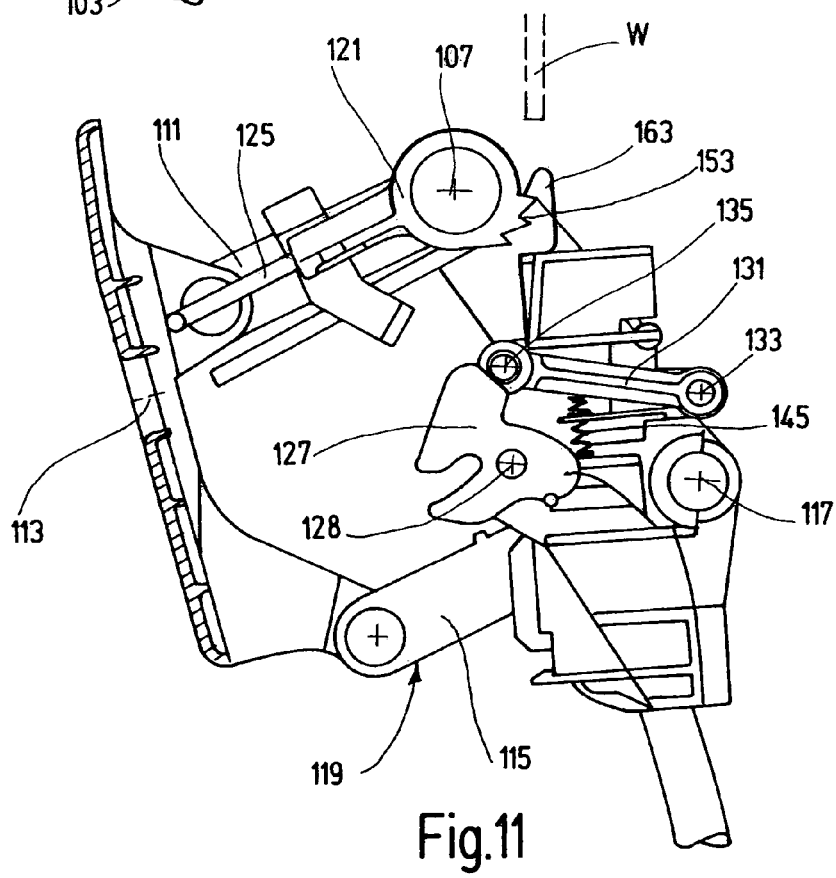

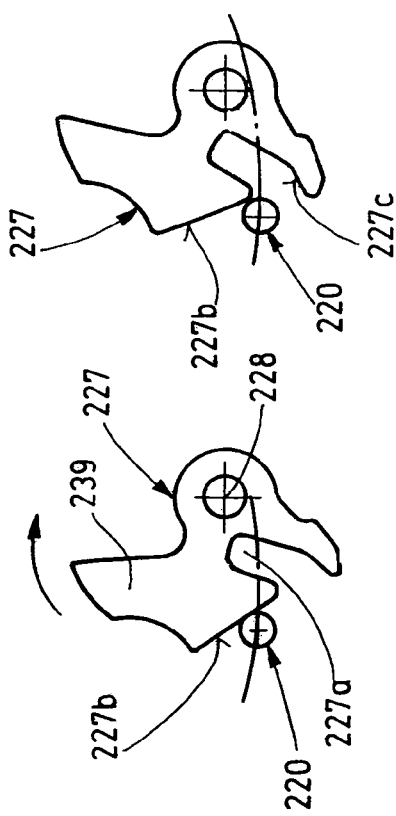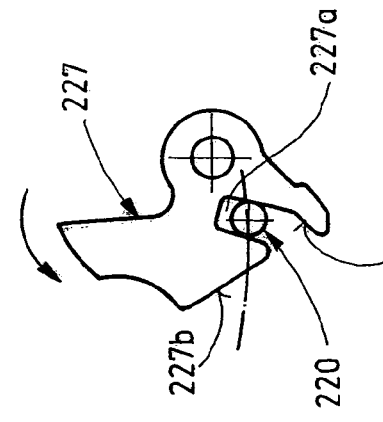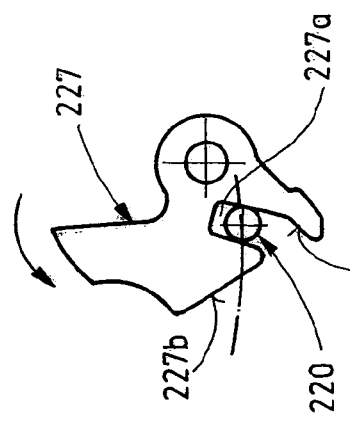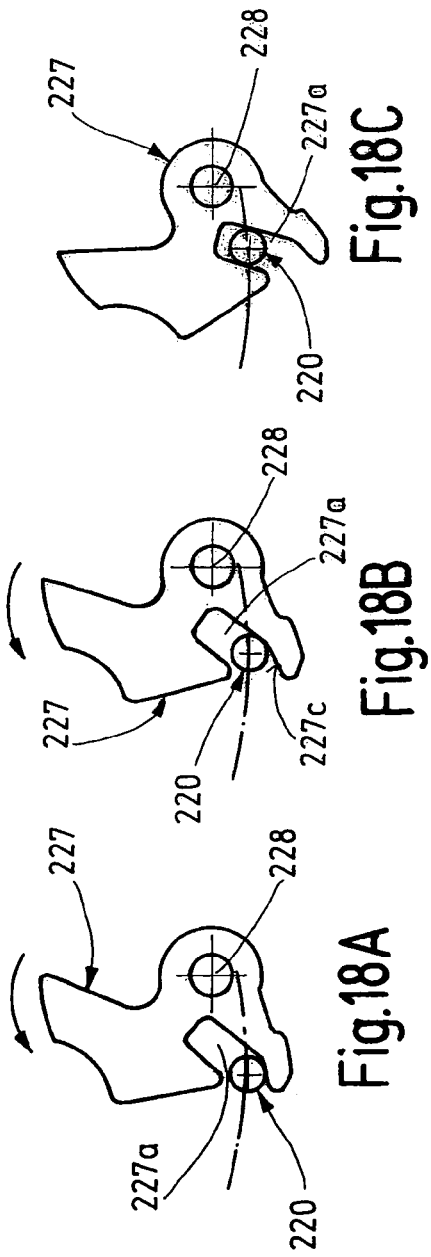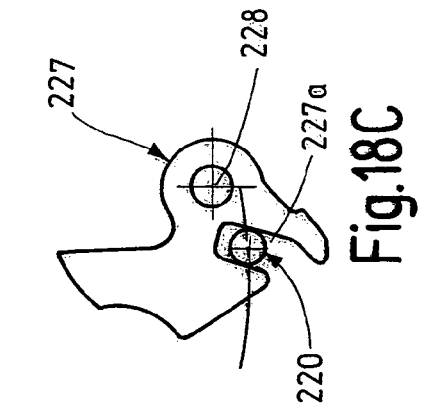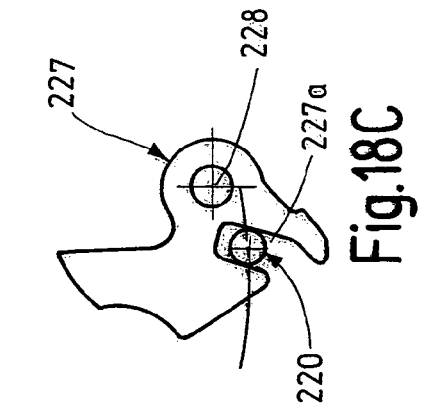

CRASH-ACTIVE HEADREST

CROSS-REFERENCE TO RELATED APPLICATION

The present application is a continuation of PCT/EP03/013757, which was filed Dec. 5, 2003, and is incorporated herein by reference, in its entirety.

BACKGROUND OF THE INVENTION

The present invention relates to a headrest for a vehicle seat, with the headrest including a four-bar linkage having upper and lower linkages mounted for pivoting relative to a carrier, and an impact element that is connected to the upper and lower linkages so that the impact element moves from an original position to a crash position by moving away from the carrier in an at least generally forward direction in response to pivoting of the upper and lower linkages; an energy storage device for driving the four-bar linkage so that the impact element moves from the original position to the crash position in response to a crash; and a crash lock for restricting the impact element from moving from the crash position toward the original position.

A headrest of the type described above is known from DE 199 51 966 A1, in which the impact element comes out in the event of a crash by means of a four-bar linkage that is in the form a parallelogram, and the drive is a spring-loaded swivel arm which locks in the crash position.

BRIEF SUMMARY OF SOME ASPECTS OF THE INVENTION

The present invention is based on the object of improving a headrest of the type described above. According to one aspect of the present invention, this object is achieved by the provision of a headrest for a vehicle seat, with the headrest including at least a four-bar linkage having upper and lower linkages mounted for pivoting relative to a carrier, and an impact element that is connected to the upper and lower linkages so that the impact element moves from an original position to a crash position by moving away from the carrier in a forward direction in response to pivoting of the upper and lower linkages, with the upper and lower linkages being unparallel. An energy storage device is provided for driving the four-bar linkage, so that the impact element moves from the original position to the crash position in response to a crash. A crash lock is provided for restricting the impact element from moving from the crash position toward the original position.

The headrest system is stabilized by the upper and lower linkages being unparallel, i.e. by means of the four-bar linkage not being a parallelogram. With this, one avoids a dead center in the four-bar linkage in the initial position, which might prevent the four-bar linkage from coming out in the event of a crash. In addition, the relevant lever acting on the linkages under the impact of forces coming from the front or from above, can thus be kept short. Finally, a more favorable capture angle can also be achieved. Preferably, all this is achieved by a difference in the length of the linkages, for example by making the lower linkages longer than the upper linkages as defined between the respective joints in the four-bar linkage. The long lower linkages also have the advantage that when the four-bar linkage comes out, the upholstered part of the impact element moves mainly at a tangent with respect to the direction of travel towards the front, this arrangement allowing a simpler covering and preventing collisions in the lower area.

Resetting the headrest after a crash makes it possible to use the headrest again, saving material and labor costs. Preferably, the passenger can reset the headrest himself, which again saves labor costs. For this, a resetting device is provided, for example a movable pull, push or rotative element integrated in the headrest, or a tool to be inserted in the headrest after a crash. For example, the resetting device returns the crash lock and, if applicable, a magnetic activator, to their original position. Preferably, a resetting device integrated in the headrest is visible only after the crash, so that any premature activation is excluded. Preferably, a resetting device in the form of a tool can be inserted into the headrest lengthwise; therefore, the resetting device has an essentially oblong shape and can thus be easily stowed away when not in use. In another preferred, simply constructed embodiment, there is a push-button on the crash lock part to release the crash lock again.

The energy storage device being in the form of a loaded spring has the advantage that with such a spring enough energy can be stored to allow the four-bar linkage to come out quickly. Retaining this loaded spring by means of a pivotable pawl that directly or indirectly holds an element which the spring bears on has the advantage that on one hand, the spring is held contour-locked with respect to the pawl, and that on the other hand, an appropriate alignment of the pawl creates favorable leverage conditions thus requiring a lesser retaining force. By using a pivotably borne restraint sheet that is borne on by the spring and held in place by the pawl, and by choosing the appropriate location of the bearing point of the spring and the retention point of the pawl, it is also possible to create favorable leverage conditions again requiring a lesser retaining force in the pawl. In the event of a crash, the restraint sheet bears on the impact element directly, or indirectly via the linkages. In normal use, it can keep the crash lock open.

Preferably, the pawl is retained, for example, by a round element borne on a pre-loaded bearing arm and preferably snapped on behind the pawl in the closing direction, preferably a rotatable roll, a bolt or a plate with circular embossment. In the event of a crash, the round element is preferably moved by a control lever linked to the carrier and preferably pre-loaded, retained in its original position preferably by a magnet. The side of the pawl which the round element bears against runs preferably perpendicular to the bearing arm of the round element, so that the pawl can exert a slight opening momentum on the round element. By contrast, the control lever is preferably coupled with the bearing arm of the round element to be carried along, or it is itself the bearing arm in order to move the round element with minimum force.

Resetting is particularly simple if initially only the control lever is brought back into the original position by the resetting device seizing the control lever, particularly if the crash lock is released and the control lever is brought back to the magnet. The headrest, more precisely the impact element, can then be re-inserted using both hands pushing against the force of the spring, without any further action being necessary simultaneously. While the spring turns back the pawl, the round element preferably rolls or slides along the pawl until it reaches the original position and the pawl, at least indirectly, locks the spring again. Discharging the control lever can be done through the locked restraint sheet. When resetting the headrest, before the pawl holds the restraint sheet, the restraint sheet preferably separates the crash lock from the control lever.

The headrest can have at least one other comfort position into which it can be brought from the original position in normal use. This has the advantage that the basic mobility of the headrest can also be used for improving comfort. This way, in the event of a crash, a crash position can be reached from any comfort position. For several comfort positions, there is preferably a lock bar on at least one of the linkages cooperating in the different comfort settings of the headrest with a snap-in pin or lock notch arranged on the carrier, i.e. friction-held and partly positively held. The comfort setting can also be stepless if the positions are secured exclusively by friction locking.

Several crash positions, which are then individually locked against backward movement by a crash lock, have the advantage that, in the event of a crash, the forward moving impact element can be locked immediately after coming in contact with the backward-moving head of the passenger. The head is then caught as much to the front as possible and does not receive any additional momentum by an undecelerated headrest. This prevents any additional load on the passenger. For the simple and cost effective production of such a crash lock, a preferred embodiment has an at least partially mobile crash lock part on the carrier and on at least one of the linkages or a crash lock toothing on a component that is moved together with the linkages, said elements cooperating in each crash position with the crash lock part, with several crash positions being defined, for example, by several teeth. By choosing a kind of saw tooth, the locking action is limited to one direction, i.e. the forward movement of the impact element is not impeded. The control lever may preferably have lateral jibs with which it lifts the crash lock parts from the crash lock teeth during resetting.

If the impact element has a restraint element, and a pivotable, unloaded pawl holds the restraint element in a locking position, releases it in the event of a crash and is ready to receive the restraint element for resetting the headrest to any of its possible positions after the crash, this provides a simple means for securing or locking the impact element for normal use, using few components. Because of the free mobility of the pawl in a certain range, means for a defined position of the pawl, such as a pre-loading spring or similar device, become unnecessary, thereby reducing production costs. Receptivity is ensured by the geometry of the pawl. Preferably, the pawl has a chamfer against which the approaching restraint element comes to bear in at least one position of the pawl. By virtue of the slanted surface, the restraint element turns the pawl, thereby opening it, so that the restraint element can enter the pawl jaw. Preferably, the pawl jaw has a lip on which the approaching restraint element can also come to bear directly in at least one position of the pawl, which is already open at that moment to enter into the pawl jaw. Normally, i.e. during normal use of the headrest, the freely mobile pawl is preferably maintained in a locking position by means of a control lever that is kept in place by a magnet.

Preferably, the restraint element is embedded over a large area in the impact element so as to ensure a large-area force transfer and reduced pressure on surfaces. Preferably, the impact element has a receptacle for the restraint element in which the restraint element, preferably having a crooked middle area, can be embedded (e.g., fitted into) positively and can be closed with a lid. The energy storage device, preferably in the form of a spring, preferably bears directly on the restraint element that is preferably made of metal, so as to avoid any high surface pressure between the metal and the plastic.

BRIEF DESCRIPTION OF THE DRAWINGS

The invention is explained in greater detail below with reference to four exemplary embodiments illustrated in the drawings, in which:

FIG. 1 is a side view of the first exemplary embodiment in the original position, the upholstery being schematically illustrated by a dashed line, FIG. 2 is a front view of the first exemplary embodiment, FIG. 3 is a section through the first exemplary embodiment along the line III—III in FIG. 2, the first exemplary embodiment being in a middle comfort position, FIG. 4 is a section through the first exemplary embodiment in the original position along the line IV—IV in FIG. 2, FIG. 5 is a partial rear view of the first exemplary embodiment, without a carrier, in the original position, FIG. 9 is a side view of the second exemplary embodiment in the original position, FIG. 10 is a view of the lower linkage of the second exemplary embodiment, FIG. 11 is a section through the second exemplary embodiment in the frontmost crash position, FIG. 17A is a view of the pawl in one first opened position with the restraint element bearing against the chamfer, FIG. 17B is a view corresponding to FIG. 17A, in which the restraint element has rotated the pawl clockwise, FIG. 17C is a view corresponding to FIG. 17A and FIG. 17B, in which the pawl has been rotated counterclockwise to the locking position, FIG. 18A is a view of the pawl in a second opened position, in which the restraint element bears against the lip, FIG. 18B is a view corresponding to FIG. 18A, in which the restraint element has rotated the pawl counterclockwise, and FIG. 18C is a view corresponding to FIG. 18A and FIG. 18B, in which the pawl has been rotated further into the locking position.

DETAILED DESCRIPTION OF THE INVENTION

Figure 6:
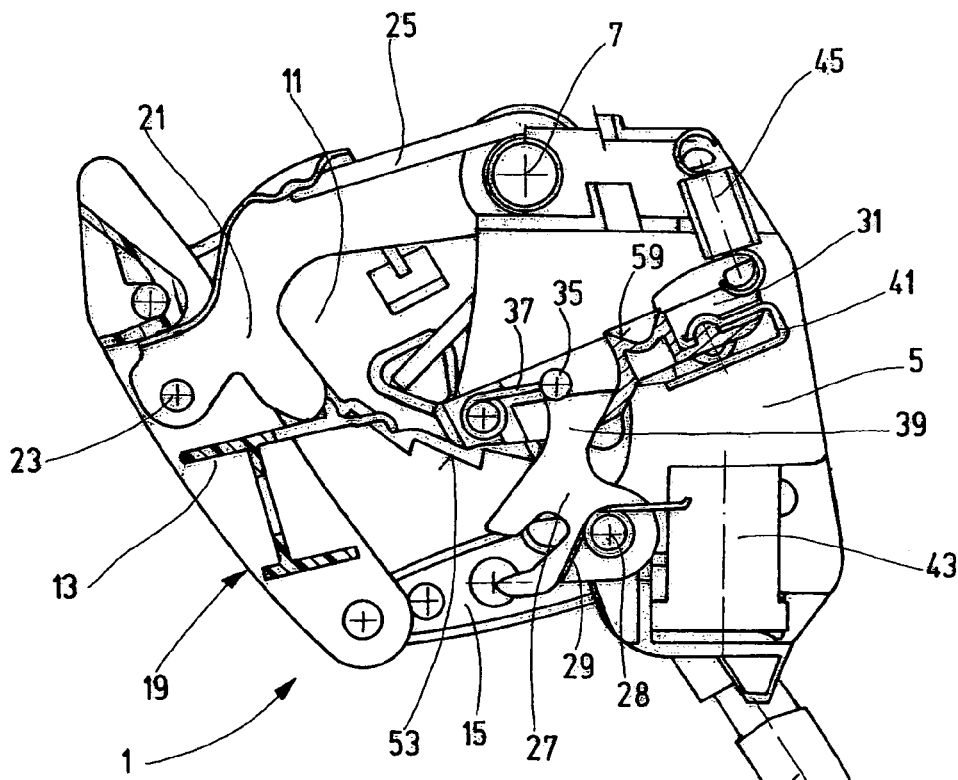
FIG. 6 is a section, corresponding to FIG. 4, in the frontmost crash position.
Figure 7:
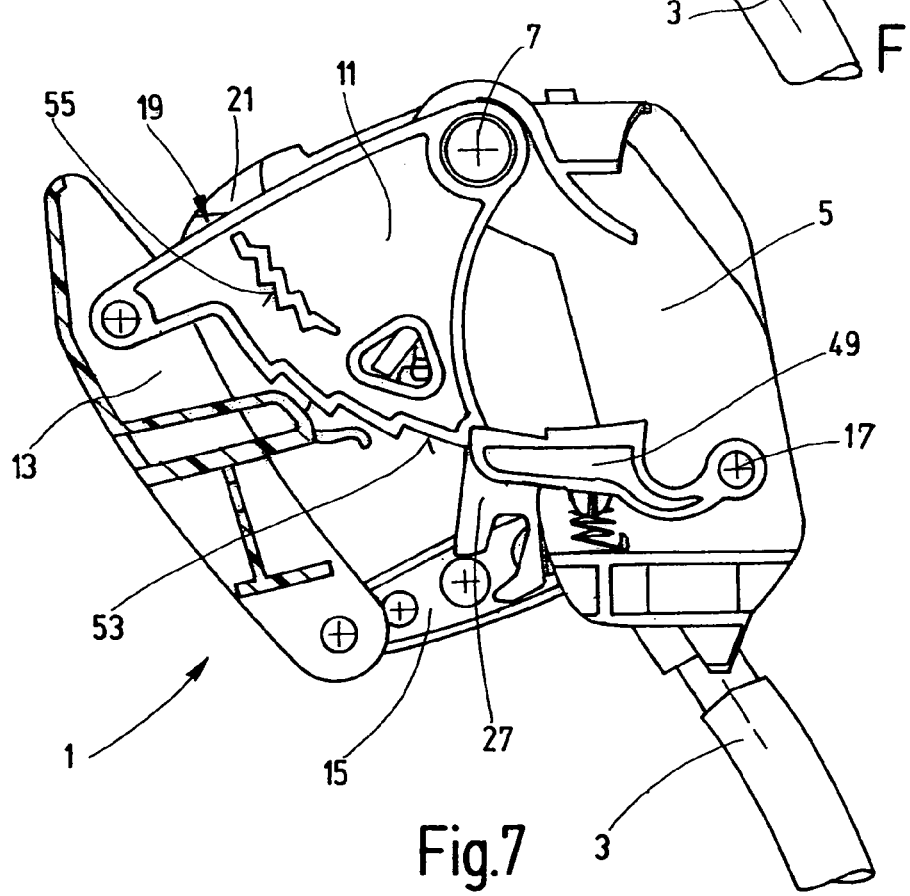
FIG. 7 is a section through the first exemplary embodiment along the line VII—VII in FIG. 2, also showing the frontmost crash position.

The first exemplary embodiment has a headrest 1 for a vehicle seat of an automobile. The height of the headrest 1 can be adjusted by means of two parallel headrest bars 3 that are movably held in the backrest of the vehicle seat. The headrest bars 3 are firmly inserted with their upper end in a carrier 5 that is arranged transversally to the head rest bars 3. A horizontally arranged axle 7 running transversally to the head rest bars 3 is borne in the upper end of the carrier 5.

A pair of upper linkages 11 is pivotably borne on the axle 7. The upper linkages 11 are at a distance from one another and each has an approximately triangular shape. The axle 7 is arranged in a corner of each upper linkage 11. The upper linkages 11 are parallel to one another, pointing frontward and downward. In the frontmost corner of each upper linkage 11, the linkage is linked to the upper end of an impact element 13, which is arranged in front of the carrier 5 (with respect to the direction of travel). The impact element 13 consists more or less of two laterally crooked legs that are connected by means of two transversal bars running parallel to the axle 7. For technical reasons, the injection molded plastic impact element 13 may be made of two essentially symmetrical halves joined together. An upholstery part is arranged on the impact element 13. However, the impact element 13 can also be the upholstery component, i.e. the upholstery can be attached directly to the impact element 13.

A pair of lower linkages 15 of oblong shape are each linked on one end to the carrier 5 by means of a horizontal linkage bearing bolt 17 running parallel to the axle 7 and, on the other end, to the lower end of the impact element 13. The carrier 5, the upper linkage 11, the impact element 13 and the lower linkage 15 together form a four-bar linkage 19. The lower linkage 15 is longer than the upper linkage 11, so that the upper linkage 11 and the lower linkage 15 are not parallel. In addition, the upper linkage 11 and the corresponding lower linkage 15 do not pivot on the same plane, but are staggered according to the crooked shape of the impact element 13.

A restraint sheet 21 with laterally folded back edges is pivotably borne on the axle 7 between the two upper linkages 11. The sheet 21 has, on the end facing away from the axle 7, a holding bolt 23 running parallel to the axle 7. On its side facing away from the impact element 13, the restraint sheet 21 arranged behind the impact element 13 (with respect to the direction of travel) covers a double torsion spring 25 which serves as an energy storing device. In its middle sector, the double torsion spring 25 bears on the restraint sheet 21. The spring 25 is coiled around the axle 7 with two laterally adjacent coil sectors and rests on the carrier 5 with two end sectors. The restraint sheet 21 is held in place by a pawl 27 which receives the holding bolt 23 into its pawl jaw. The pawl 27 is pivotably borne on the carrier 5 on a pawl bearing bolt 28 that is parallel to the axle 7, and the pawl is preloaded in the opening direction by means of a pawl spring 29 that is weaker than the double torsion spring 25 opposite the carrier 5.

A control lever 31 pointing backward (from the direction of travel) is pivotably borne on a lever bearing bolt 33 that is parallel to the axle 7 on the carrier 5 above the pawl 27. There is a round element 35 that can roll and whose rotation axle is aligned parallel to the lever bearing bolt 33. The round element 35 is rotatably borne on the angled end section of a leg of a holding spring 37 in the shape of a torsion spring, the leg serving as a bearing arm. The holding spring 37 is borne on the lever bearing bolt 33. A laterally protruding material part of the control lever 31 being arranged below the leg of the holding spring 37 on which the round element 35 is borne. In order to lock the pawl 27, the round element 35 is arranged in front (in the opening direction) of the pawl 27, more precisely in front of a lock arm 39 of same, i.e., from the opposite perspective, behind the pawl 27 (in the closing direction), this arrangement, because of the preloaded condition, being referred to below as snapped on.

A metal contact plate 41 snapped on from behind is arranged at the side of the free end of the plastic control lever 31. The contact plate 41 is attracted, during normal use, by a magnet 43 arranged below the control lever 31, against whose face it bears. A release spring 45 in the shape of a tension spring, one end of which is hooked into the control lever 31 and the other into the upper end of the carrier 5, preloads the control lever 31 in the direction facing away from the magnet 43, i.e. upward.

Beside the line connecting the lever bearing bolt 33 and the contact plate 41, there is a jib 47 formed onto each side of the control lever 31, extending to the left and the right, respectively. The free end of a crash lock arm 49 is arranged below the free end of each jib 47, at a short distance, said arm being rotatably borne on the linkage bearing bolt 17. The arm of the crash lock 49 serving as crash lock part is preloaded in an upward direction, but is retained downward during normal use by the restraint sheet 21.

On its upper side, the crash lock arm 49 has two steps of a kind of saw-like toothing. For the upper linkage 11 to cooperate with the crash lock arm 49, as will be described below, the upper linkage 11 has a corresponding saw-like toothing serving as crash lock toothing 53 on the side that is away from the axle 7 and curves around said axle 7. A toothed lock bar 55 is formed onto the outer side of the upper linkage 11 between the crash lock toothing 53 and the axle 7. A snap-in lug 57 made of spring steel, attached to the carrier 5 and pointing frontward, has a lock notch on its free end, by means of which it cooperates with the lock bar 55 essentially through friction adhesion.

During normal use, the headrest 1 can be in the comfort position, i.e. the impact element 13 with the upholstery (shown by a dashed line in FIG. 1) attached to it can be moved by the passenger by means of the four-bar linkages 19, thereby defining and securing the different comfort positions that may be assumed, by the cooperation of the lock bar 55 and the snap-in lug 57. There are three comfort positions in the present example. The frontward movement of the impact element 13 is easy to achieve, whereas the backward movement is more difficult, so that the setting does not change when the head is in a normal position. In order to limit the forward and backward movement of the upper linkage 11, a stop that comes to bear frontward against the restraint sheet 21 and backward against the carrier 5 is formed onto the upper linkage. In the comfort setting, the restraint sheet 21 remains locked, i.e. the double torsion spring 25 remains loaded. Only in the rearmost comfort position, the restraint sheet 21 bears against the impact element 13.

In the event of a rear crash, the magnet 43 receives an impulse and releases the contact plate 41. The release spring 45 then pulls the control lever 31 upward, taking the holding spring 37 together with the round element 35 with it. The pawl 27 is thereby released, so that the unloading double torsion spring 25 can push the restraint sheet 21 forward and simultaneously open the pawl 27 via the holding bolt 23. With this, the crash-active headrest 1 is activated. The restraint sheet 21 comes to bear against the impact element 13 which is projected forward while the four-bar linkages 19 come out. Simultaneously, the crash lock arms 49 released by the restraint sheet 21, and being spring-loaded, swing upward and come to bear against the upper linkages 11. The saw-like teeth of the crash lock arms 49 and the crash lock teeth 53 are aligned in such a way that the forward movement of the upper linkages 11 is not impeded.

Because of the steps, any backward movement would be blocked in several possible positions which will be referred to below as crash positions. As long as the impact element 13 encounters no resistance, it moves into the first possible crash position. If, however, the impact element 13 comes into contact with the head of the passenger, the crash lock arms 49 and the crash lock teeth 53 lock into the next crash position going back. This way, the backward movement of the passenger's head is stopped as far forward as possible, the head thus suffering as little displacement as possible.

Figure 8:
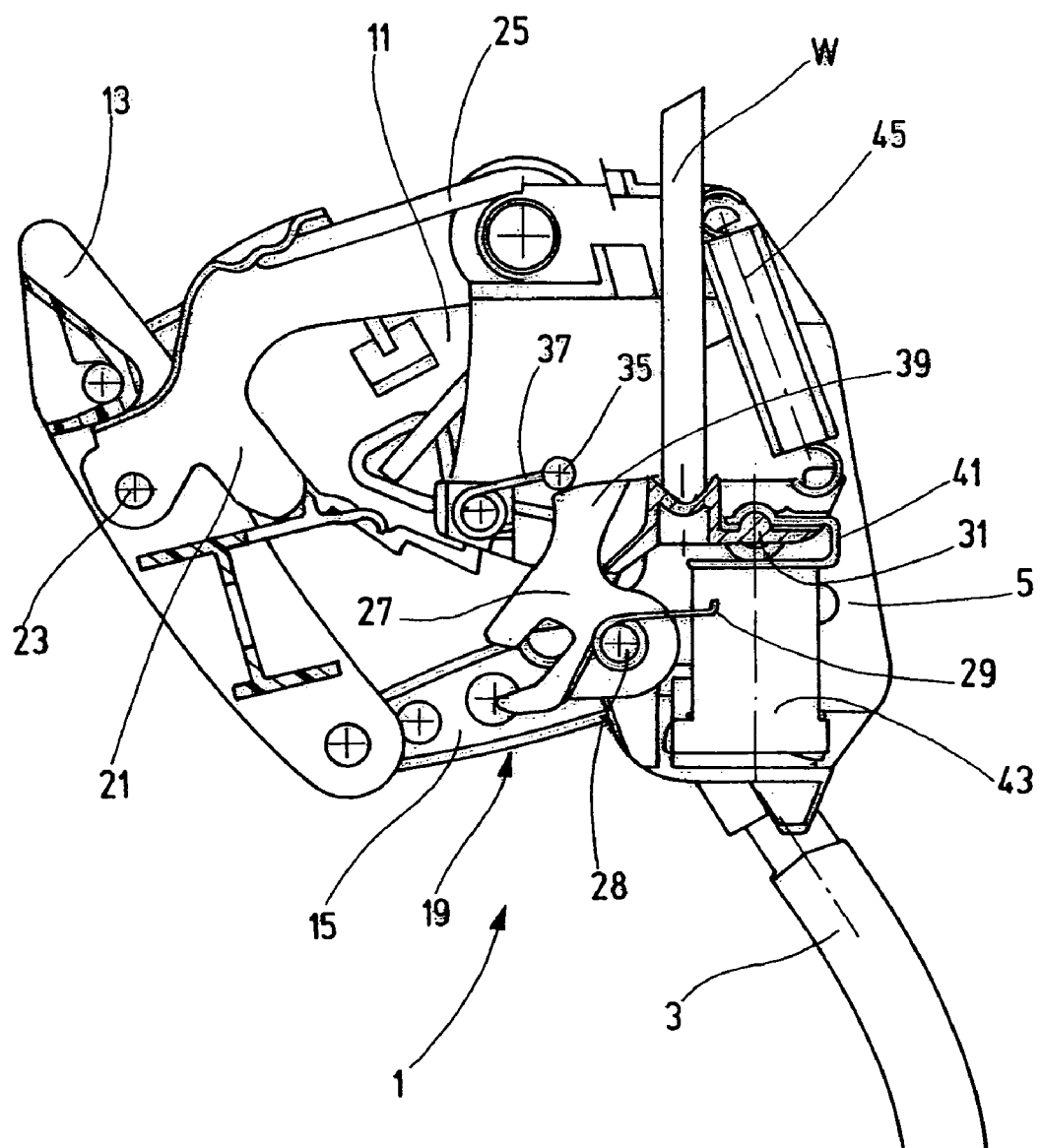
FIG. 8 is a section, corresponding to FIG. 6, during resetting.

The crash-active headrest can be reset after a crash, i.e. it can be brought back into its original position. For this there is an opening in the carrier 5 and its face, into which a resetting device W (FIG. 8) having the function of a rod-like tool can be inserted lengthwise; in the present example, from above in an approximately vertical direction. Since, because of the movement of the control lever 31, the distance between the contact plate 41 and the magnet 43 is too great for any automatic attraction, the resetting device W is inserted into a receptacle 59 in the control lever 31, following which the control lever 31 is pushed downward by a further movement against the force of the release spring 45 until the contact plate 41 is attracted by the magnet 43 and remains there. Moving the control lever 31 downward, its jibs 47 push the crash lock arms 49 downward, i.e. out of the crash lock toothing 53. The control lever 31 is now in its original position. In a modified embodiment, the resetting device W, being linked to the control lever 31, is pushed upward in the event of a crash and is then visible and ready to be activated.

By exerting manual pressure on the impact element 13 from the front, preferably with both hands, the impact element 13 and thus the restraint sheet 21 can again be moved backward against the force of the loading double torsion spring 25, to its lock that is ready to receive it. As soon as the holding bolt 23 comes to bear against the protruding lip of the pawl 27, the pawl 27 is rotated into its original position by means of the holding bolt 23. The round element 35 bearing on the lock arm 39 of the pawl 27 on the upper side of said pawl and being pushed slightly upward with respect to the original position now rolls along the edge of the lock arm 39. As soon as the round element 35 reaches the top of the lock arm 39, it snaps downward onto the rear side of the lock arm 39, i.e. onto the side facing away from the closing direction. This way the pawl 27 is locked again. When rotating the pawl 27 back, the restraint sheet 21 also comes to bear against the crash lock arms 49, swinging them back into their original position, thereby discharging the control lever 31.

The second exemplary embodiment is similar to the first exemplary embodiment unless the modifications are described below. For this reason, the reference signs of identical components and components having identical functions are increased by 100. In the headrest 101, the carrier 105 is again attached to the headrest bars 103, with the carrier pivotably bearing the horizontal axle 107. The upper linkages 111 are linked to the axle 107 and a plate-shaped impact element 113, while the longer lower linkages 115 are also linked at one end to the impact element 113 and, at the other end, by means of linkage bearing bolts 117 running parallel to the axle 107, to the carrier 105, thus forming a four-bar linkage 119 again on either side of the headrest 101. For the comfort setting, one lock bar 155 is formed onto each of the lower linkages 117, cooperating with a lock notch 161 of the carriers 105, so as to secure several comfort positions. The setting itself is done by pulling or exerting pressure on the upholstered impact element 113.

For the event of a crash, a double torsion spring 125 is coiled around the axle 107 as a energy storage device and is supported by the carrier 105. A catch plate 121 that is pivotably borne on the axle 107 is snapped onto the double torsion spring 125. The preloaded double torsion spring 125 is held by a pawl 127 that is rotatably borne on a pawl bearing bolt 128. The pawl 127 that is preloaded in the opening direction is locked by a round element 135 that is borne as a rotatable roll on a control lever 131 having the function of a bearing arm. The control lever 131 that is pivotably borne on a lever bearing bolt 133 is kept in place by a magnet (not shown in detail) against the preload of an release spring 145 in the form of a pressure spring.

In the event of a rear-end crash, the magnet receives an impulse, releasing the control lever 131, which swings upward, lifting the round element 135. With this, the pawl 127 is opened and the double torsion spring 125 is released. The unloading double torsion spring 125 thrusts the impact element 113 forward, i.e. the four-bar linkages 119 are moved and come out. There is a crash lock toothing 153 on the carried-along catch plate 121 in the area of the axle 107, which slides along a lock plate 163 with a lock notch. The lock plate 163 having the function of a crash lock part is movable at least in the area of the lock notch and made in such a way as to lock with the crash lock toothing 153 if a backward directed force acts on the catch plate 121. If there is no resistance exerted by the head of the passenger on the impact element 113, the headrest 101 locks into the frontmost crash position. In the case of contact with the head, locking occurs in the next crash position backwards.

When resetting the headrest 101 after a crash, a rod-like resetting device W is inserted into the headrest 101 from above in approximately the vertical direction, the device at first pushing aside the lock plate 163, so that the catch plate 121 is released. The impact element 113 can now be pushed backward, whereby the double torsion spring 125 is loaded until it is received and locked by the pawl 127. By a further lengthwise movement of the resetting device W, the resetting device can push the control lever 131 downward while loading the release spring 145, so that the round element 135 rolling along the pawl 127 can secure the pawl 127. Once the magnet again retains the control lever 131, the original position is reached.

Figure 12:
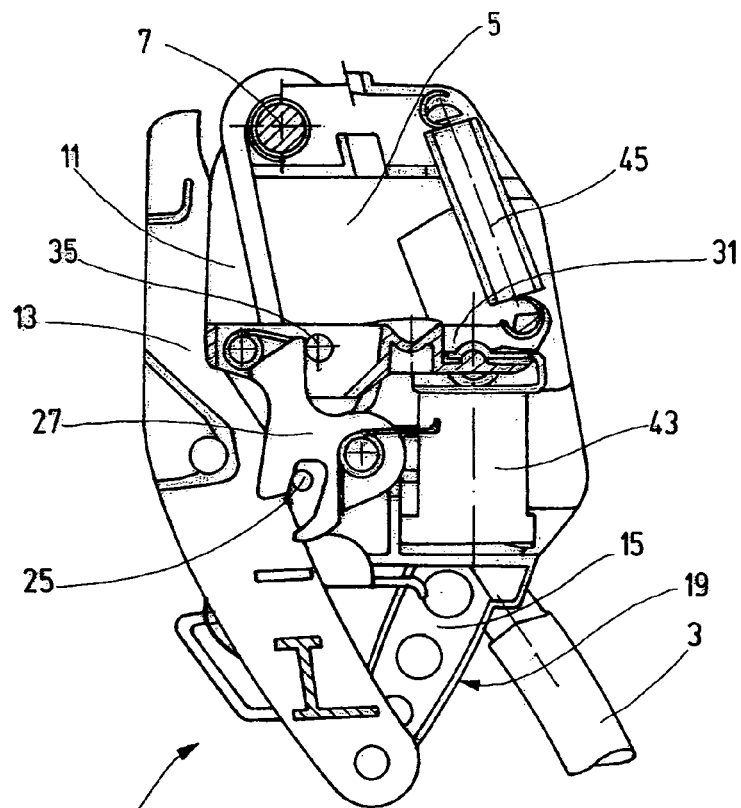
FIG. 12 is a section through the first variation of the third exemplary embodiment.
Figure 13:
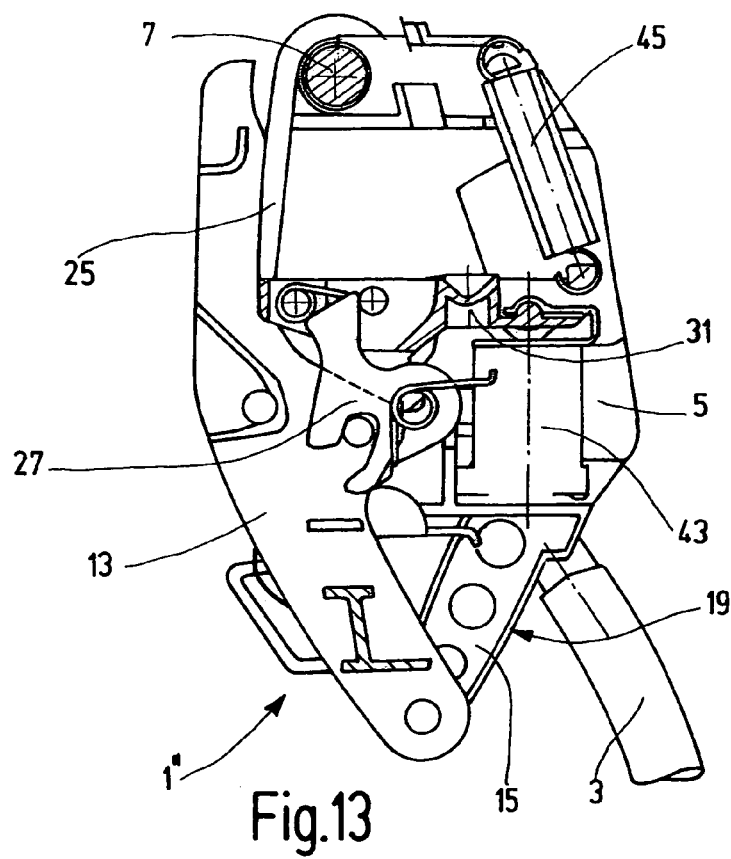
FIG. 13 is a section through the second variation of the third exemplary embodiment, FIG. 14 schematically illustrates a section through the fourth exemplary embodiment along the line XIV—XIV in FIG. 16, FIG. 15 schematically illustrates a side view of the fourth exemplary embodiment looking in the direction of the arrow XV in FIG. 16.
Figure 14:
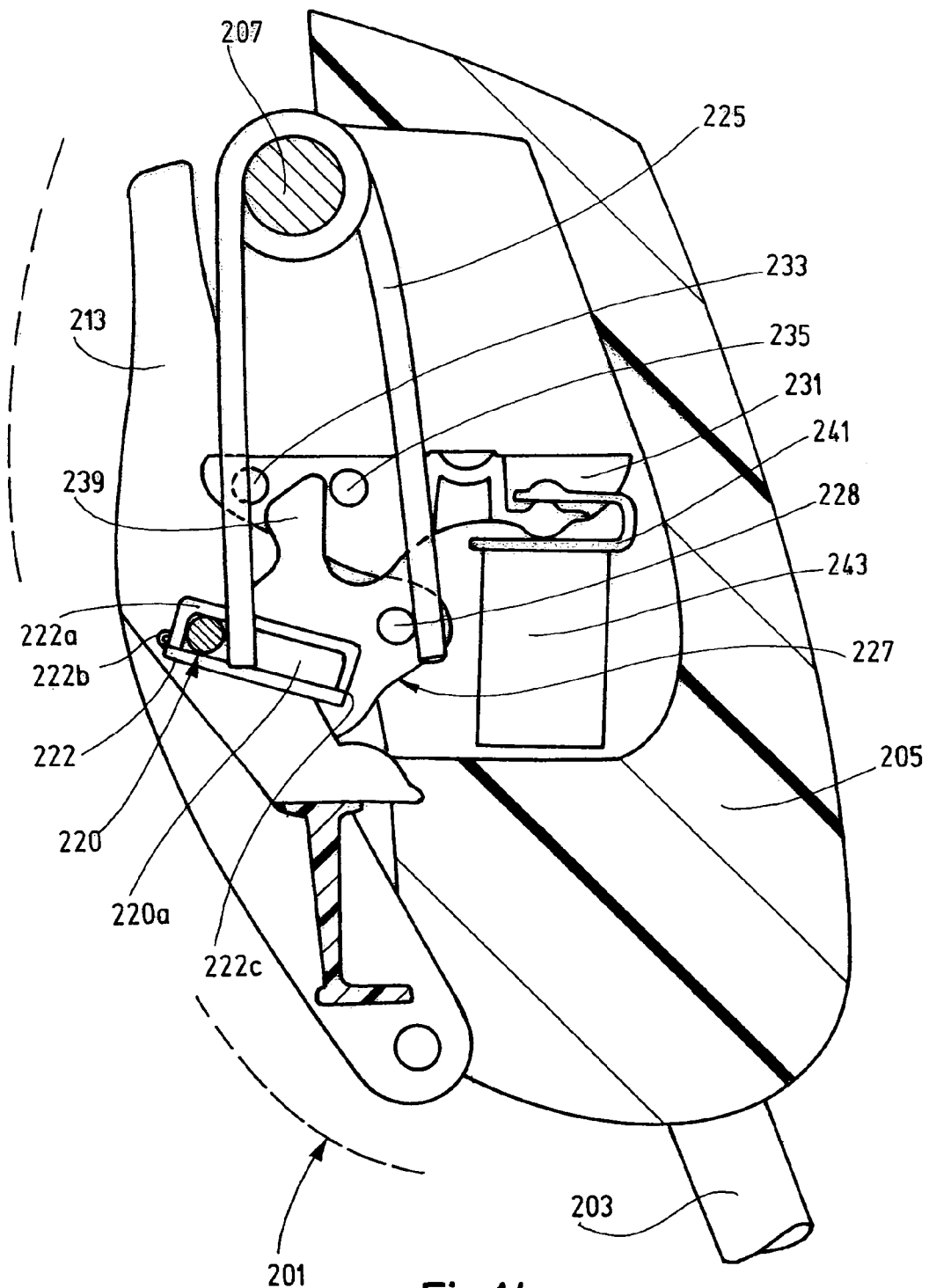
Figure 15:
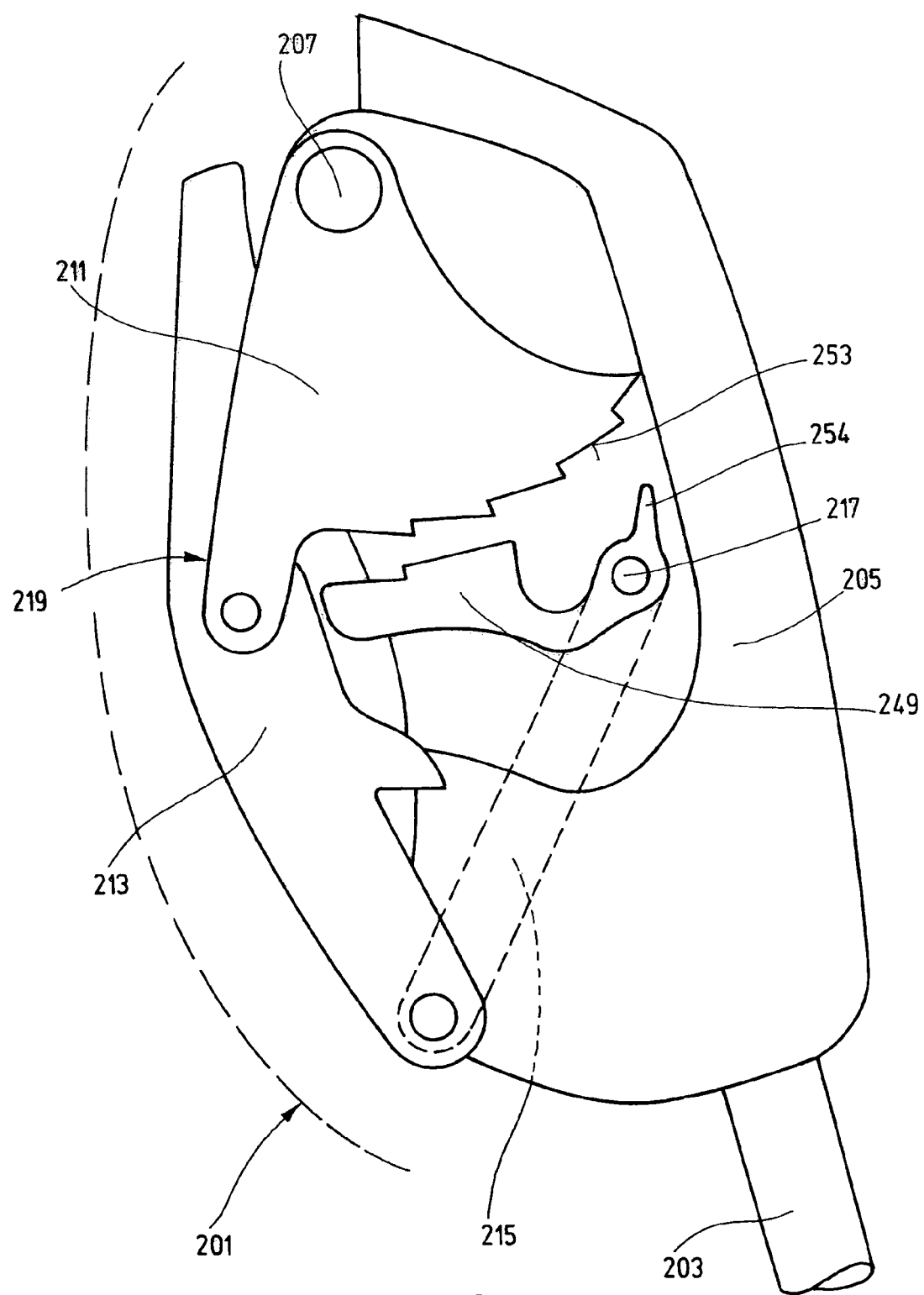
Figure 16:
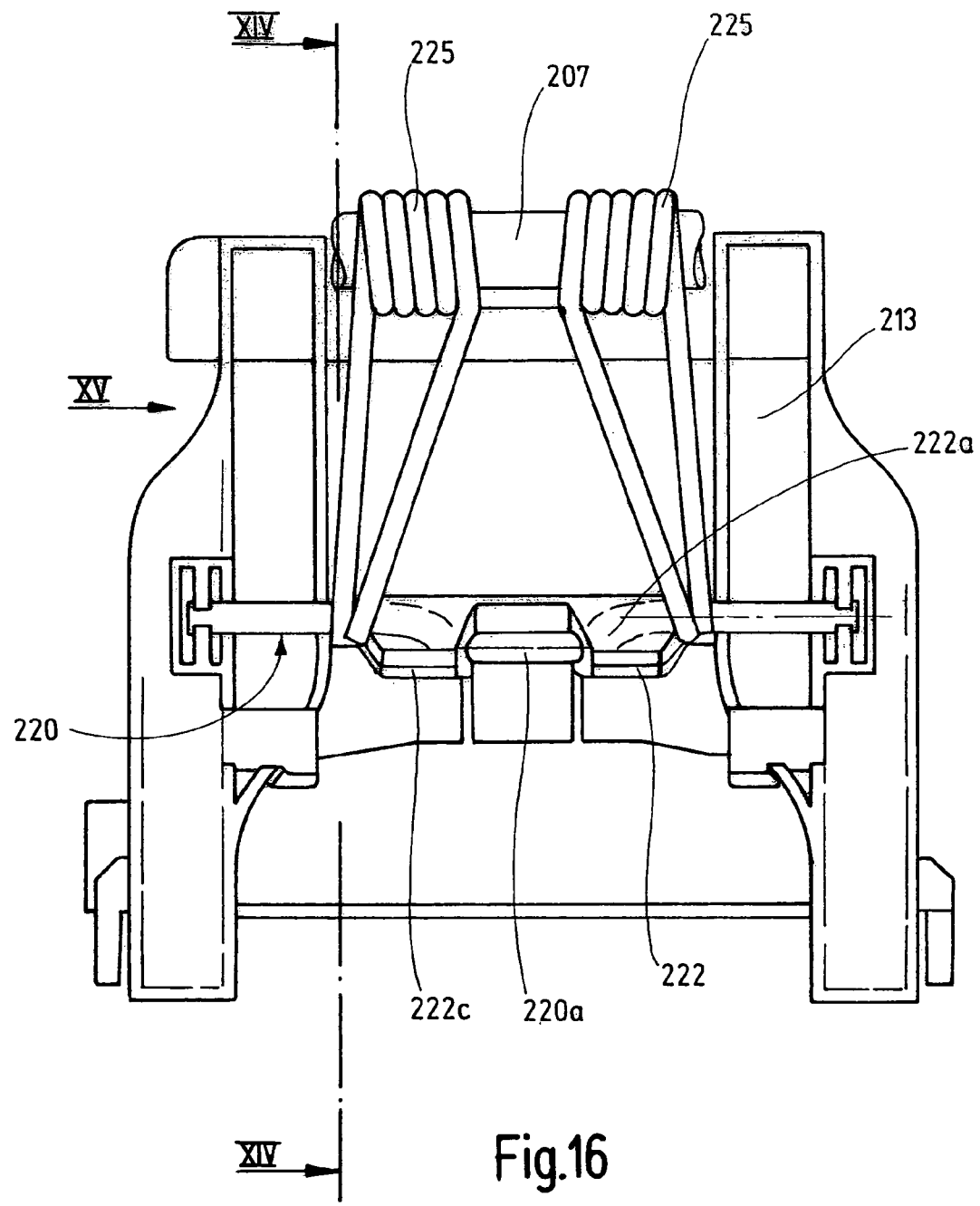
FIG. 16 is a rear view of the impact element and some connected components in the fourth exemplary embodiment.

The third exemplary embodiment, unless described otherwise below, is similar to the first exemplary embodiment. For this reason, identical components have identical reference signs, and modified components having identical functions have reference signs followed by apostrophes. The third exemplary embodiment is a variation without a comfort position. This makes it possible to eliminate several components, in particular the restraint sheet, because the double torsion spring 25 can act directly on the impact element 13 or the upper linkages 11. In the original position, the pawl 27 retains either the preloaded double torsion spring 25, as is shown for the first variation of the headrest 1' in FIG. 12, or the borne-on impact element 13', as is shown for the second variation of the headrest 1" in FIG. 13. The lock notch, and thus the lock bar, can also be eliminated. Activation in the event of a crash, locking in a possible crash position and resetting after a crash correspond to the first exemplary embodiment.

The fourth exemplary embodiment, unless otherwise described below, is similar to the first exemplary embodiment. For this reason, identical components and components having identical functions are given reference signs increased by 200. In the headrest 201 which, like the third exemplary embodiment, has no comfort position, the two headrest bars 203 are again inserted into the carrier 205 in which the axle 207 is borne. The upper linkages 211 which are pivotably borne on the axle 207 are linked to the upper end of the laterally crooked impact element 213 which is arranged in front of the carrier 205 (with respect to the direction of travel). The lower linkages 215 are each linked to the carrier 205, at one end by means of a horizontal linkage bearing bolt 217 running parallel to the axle 207 and, at the other end, to the lower end of the impact element 213. The carrier 205, the upper linkage 211, the impact element 213 and the lower linkage 215 together form a four-bar linkage 219. The lower linkage 215 in this arrangement is again longer than the upper linkage 211, so that the upper linkage 211 and the lower linkage 215 are not parallel. In addition, the upper linkage 211 and the corresponding lower linkage 215 do not swivel on the same plane, but are staggered by virtue of the crooked shape of the impact element 213.

A metal restraint element 220 having an essentially horizontal position is arranged halfway up the impact element 213. In its middle, the restraint element 220 that is mirror symmetrical with respect to a vertical middle plane has a middle area 220a that is crooked on both sides. The middle area 220a is positively placed in a receptacle 222 of the impact element 213 and positively covered by a lid 222a. The lid 222a is attached to the receptacle 222 by means of a film hinge 222b and releasably connected to same by means of a clip connection 222c. At its ends, the restraint element 220 is inserted into the impact element 213.

Behind the impact element 213 (with respect to the direction of travel), two mirror symmetrical double torsion springs having the function of energy storage devices 225 are coiled around the axle 207, each being supported with one leg on the carrier 205 and bearing with the other leg on the restraint element 220 in an area at the side of the crooked middle area 220a. Because of the metal-to-metal contact between the energy storage device 225 and the restraint element 220 and because the restraint element 220 is embedded over a large surface in the impact element 213, the force enters the plastic material of the impact element 13 with only low surface pressure. The restraint element 220, and thereby the impact element 213 being borne on by the energy storage device 225, is retained by a pawl 227 receiving the crooked middle area 220a of the restraint element 220 with its pawl jaw 227a. The pawl 227 is pivotably borne on the carrier 205 on a pawl bearing bolt 228 running parallel to the axle 7.

A control lever 231 pointing backward (with respect to the direction of travel) is pivotably borne on a lever bearing bolt 233 running parallel to the axle 207 above the pawl 227. The control lever 231 is positioned in a plane located to the side of said pawl. A round element 235 firmly connected to the control lever 231 and extending from it parallel to the lever bearing bolt 233 locks the pawl 227. For this purpose, the round element 235 is arranged in front of the pawl 227 (in the opening direction of said pawl), more precisely in front of a lock arm 239 of said pawl or, from the opposite perspective, behind the pawl 227 (in the closing direction). A metal contact plate 241 snapped on from behind is arranged at the side of the free end of the plastic control lever 231, the plate, during normal conditions, being attracted by a magnet 243 arranged below the control lever 231 and touching the front part of same. The magnet 243 consists of a permanent magnet and an electromagnet with opposite polarity which, under normal conditions, is not energized.

There are two crash lock arms 249, and each is rotatably borne on a respective linkage bearing bolt 217 in the plane of the respective upper linkage 211. On its upper side, the crash lock arm 249 has two levels of a saw-like toothing. For the upper linkage 211 to cooperate with the crash lock arm 249, as shall be described below, the upper linkage 211 has, on the side facing away from the axle 207 and curved around the axle 207, a corresponding saw-like toothing as a crash lock toothing 253. A push button 254 is formed onto the crash lock arm 249 in the area of the linkage bearing bolt 217.

In the event of a rear-end crash, the magnet 243 receives an impulse, releasing the contact plate 241. The control lever 231 swings upward, removing the round element 235 from the pawl 227. Thereby the pawl 227 is released, so that the unloading energy storage device 225 can open the pawl 227 by means of the restraint element 220, this activating the crash-active headrest 1 and simultaneously letting the impact element 213 shoot forward while the four-bar linkages 219 are coming out. At the same time, the crash lock arms 249 swing upward and come to bear against the upper linkages 211. The saw-like teeth of the crash lock arms 249 and the crash lock teeth 253 are aligned in such a way that the frontward movement of the upper linkages 211 is not impeded.

A backward movement would be locked in several possible positions because of the steps which will be referred to below as crash positions. As long as the impact element 213 does not encounter any resistance, it moves into the frontmost crash position. However, if the impact element 213, prior to this, comes to bear against the head of a passenger, the crash lock arms 249 and the crash lock teeth 253 lock it in the next crash position to the back. This way, the backward movement of the passenger's head is stopped as far forward as possible, the head thus suffering as little displacement as possible.

The crash-active headrest 201 can be reset after a crash, i.e. it can be brought back to its original position. For this resetting, the crash lock arms 249 can be swiveled from the crash lock teeth 253 by means of the push buttons 254. Exerting manual pressure from the front on the impact element 213, preferably with both hands, the impact element 213 can now again be moved backward against the force of the loading energy storage device 225.

In the present example, the pawl 227 is conceived in such a way that it is self-lifting in each of its possible positions, i.e. it is open or is opened by means of the arriving restraint element 220, receiving the restraint element 220 (i.e. more precisely its cranked middle area 220a) and closing again. Two such opened positions are shown in the figure, in which the pawl 227 is ready to receive the restraint element 220. If the pawl jaw 227a points downward, the restraint element 220 comes to bear against a chamfer 227b, thereby rotating the pawl 227 clockwise in the figure. As soon as the restraint element 220 comes to bear against the pawl jaw 227a or a protruding lip 227c of said jaw, the pawl 227 is rotated in the opposite direction back into its closing original position in which it retains the restraint element 220. If, on the contrary, the pawl jaw 227a points forward, the restraint element 220 comes to bear directly against the lip 227c. When moving further, the pawl 227, in the figure, rotates counterclockwise into its original position. The control lever 231, for example, is pushed downward by means of a rod-shaped resetting device W until the contact plate 241 is attracted by the magnet 243 and adheres to it. The pawl 227 is locked again by the round element 235 of the control lever 231.

That which is claimed:

1. A headrest that is for a vehicle seat and operates advantageously in the event of a crash, the headrest comprising:
   at least a four-bar linkage including
   (a) upper and lower linkages mounted for pivoting relative to a carrier, wherein the upper and lower linkages being mounted for Pivoting relative to the carrier comprises
      (1) the upper linkage being pivotably connected to the carrier at a position, and
      (2) the lower linkage being pivotably connected to the carrier at a position that is distant from the position where the upper linkage is pivotably connected to the carrier, and
   (b) an impact element that is operatively connected to the upper and lower linkages for moving away from the carrier in an at least generally forward direction, from an original position to a crash position, in response to pivoting of the upper and lower linkages relative to the carrier, wherein the impact element being operatively connected to the upper and lower linkages for moving away from the carrier in the at least generally forward direction, from the original position to the crash position, in response to pivoting of the upper and lower linkages relative to the carrier, comprises
      (1) the impact element being pivotably connected to the upper linkage at a position that is distant from the position where the upper linkage is pivotably connected to the carrier and
      (2) the impact element being pivotably connected to the lower linkage at a position that is distant from both
         (i) the position where the lower linkage is pivotably connected to the carrier, and
         (ii) the position where the impact element is pivotably connected to the upper linkage;
   an energy storage device for driving the linkage so that the impact element moves from the original position to the crash position in response to the crash; and
   a crash lock for restricting the impact element from moving from the crash position toward the original position,
   wherein the upper and lower linkages are unparallel with respect to one another.

2. A headrest according to claim 1, wherein the lower linkage's length and the upper linkage's length are different.

3. A headrest according to claim 2, wherein the lower linkage's length is greater than the upper linkage's length.

4. A headrest according to claim 2, wherein the crash lock is operative for being unlocked, in a predetermined manner, while the impact element is in the crash position, so that the impact element can be moved from the crash position to the original position.

5. A headrest according to claim 2, wherein the energy storage device is a spring, the spring is in a first configuration while the impact element is in the original position, the spring is in a second configuration while the impact element is in the crash position, a pawl is mounted for pivoting between first and second positions, and the pawl at least indirectly releasably holds the spring in the spring's first configuration while the pawl is in the pawl's first position.

6. A headrest according to claim 1, wherein the crash lock is operative for being unlocked, in a predetermined manner, while the impact element is in the crash position, so that the impact element can be moved from the crash position to the original position, whereby the impact element is reset to the original position.

7. A headrest according to claim 6, further comprising a resetting device that is operative, while the impact element is in the crash position, for unlocking the crash lock so that the impact element can be moved to the original position.

8. A headrest according to claim 7, wherein:
   the energy storage device includes a spring,
   the spring is in a first configuration while the impact element is in the original position,
   the spring is in a second configuration while the impact element is in the crash position,
   a pawl is mounted for pivoting between first and second positions, and the pawl at least indirectly releasably holds the spring in the spring's first configuration while the pawl is in the pawl's first position,
   a control lever is operatively connected to the carrier for moving between first and second positions,
   the pawl is retained in the pawl's first position while the control lever is in the control lever's first position,
   the pawl can move to the pawl's second position while the control lever is in the control lever's second position,
   the resetting device is operative, while the impact element is in the crash position, for moving the control lever from the control lever's second position to the control lever's first position, so that the headrest can be returned to a state in which: the impact element is in the original position, the spring is in the spring's first configuration, and pawl is in the pawl's first position so that the pawl at least indirectly releasably holds the spring in the spring's first configuration.

9. A headrest according to claim 8, further comprising a magnet for releasably holding the control lever in the control lever's first position.

10. A headrest according to claim 8, wherein the resetting device unlocks the crash lock via the control lever.

11. A headrest according to claim 8, wherein the spring bears against a pivotably mounted restraint sheet that is releasably held by the pawl while the pawl is in the pawl's first position.

12. A headrest according to claim 7, wherein the resetting device includes a tool that can be inserted lengthwise into the headrest.

13. A headrest according to claim 7, wherein the resetting device includes a button on a movable part of the crash lock.

14. A headrest according to claim 7, wherein the energy storage device is a spring, the spring is in a first configuration while the impact element is in the original position, the spring is in a second configuration while the impact element is in the crash position, a pawl is mounted for pivoting between first and second positions, and the pawl at least indirectly releasably holds the spring in the spring's first configuration while the pawl is in the pawl's first position.

15. A headrest according to claim 6, wherein the energy storage device is a spring, the spring is in a first configuration while the impact element is in the original position, the spring is in a second configuration while the impact element is in the crash position, a pawl is mounted for pivoting between first and second positions, and the pawl at least indirectly releasably holds the spring in the spring's first configuration while the pawl is in the pawl's first position.

16. A headrest according to claim 1, wherein the energy storage device is a spring, the spring is in a first configuration while the impact element is in the original position, the spring is in a second configuration while the impact element is in the crash position, a pawl is mounted for pivoting between first and second positions, and the pawl at least indirectly releasably holds the spring in the spring's first configuration while the pawl is in the pawl's first position.

17. A headrest according to claim 16, further comprising a movably mounted holding element for releasably holding the pawl in the pawl's first position.

18. A headrest according to claim 17, further comprising a control lever that is operatively connected to the carrier so that the control lever is operative in response to the crash to move the holding element so that the holding element releases the pawl, so that the pawl can move to the pawl's second position.

19. A headrest according to claim 18, wherein the control lever is biased by a spring.

20. A headrest according to claim 17, wherein the holding element is round and is adjacent a side of the pawl that faces from the pawl's closing direction.

21. A headrest according to claim 17, wherein the holding element is round and is carried by a movable bearing arm.

22. A headrest according to claim 16, wherein the spring bears against a pivotably mounted restraint sheet that is releasably held by the pawl while the pawl is in the pawl's first position.

23. A headrest according to claim 16, wherein:
the original position of the impact element can be either of at least a first position of the impact element and a second position of the impact element,
the first position of the impact element is rearward of the second position of the impact element,
the first position of the impact element is rearward of the crash position of the impact element, whereby the first position of the impact element is comfortable for a user of the vehicle seat,
the second position of the impact element is rearward of the crash position of the impact element, whereby the second position of the impact element is comfortable for a user of the vehicle seat, and
the headrest can be releasably maintained in, and moved between, the first position of the impact element and the second position of the impact element.

24. A headrest according to claim 16,
the crash position of the impact element can be either of at least a first position of the impact element and a second position of the impact element,
the first position of the impact element is rearward of the second position of the impact element,
the crash lock is operative for restricting the impact element from moving from the first position of the impact element toward the original position of the impact element, and
the crash lock is also operative for restricting the impact element from moving from the second position of the impact element toward the original position of the impact element.

25. A headrest according to claim 16, wherein the crash lock is further for being selectively unlocked while the impact element is in the crash position, so that the impact element can be moved from the crash position to the original position, and wherein the pawl is at least substantially unloaded while the impact element is in the crash position, and the pawl is operative for:
holding a restraint element of the impact element and thereby maintaining the impact element in the original position, while the pawl is in the pawl's first position and prior to the crash,
releasing the restraint element in response to the crash, so that the spring can drive the linkage so that the impact element moves from the original position to the crash position, and
receiving the restraint element and then releasably holding the restraint element so as to maintain the impact element in the original position, in response to the impact element being moved from the crash position to the original position.

26. A headrest according to claim 25, wherein:
the pawl has a chamfer for bearing against the restraint element for a predetermined period that occurs while the impact element is being moved from the crash position to the original position,
the pawl has a pawl jaw with a lip for bearing against the restraint element for a predetermined period that occurs while the impact element is being moved from the crash position to the original position,
a substantial portion of the restraint element is fitted into an other part of the impact element, and
the other part of the impact element includes a receptacle that is closed with a lid, and the restraint element includes a crooked middle section that is fitted into the receptacle and engaged by the pawl.

27. A headrest according to claim 1, wherein:
the original position of the impact element can be either of at least a first position of the impact element and a second position of the impact element,
the first position of the impact element is rearward of the second position of the impact element,
the first position of the impact element is rearward of the crash position of the impact element, whereby the first position of the impact element is comfortable for a user of the vehicle seat,
the second position of the impact element is rearward of the crash position of the impact element, whereby the second position of the impact element is comfortable for a user of the vehicle seat, and
the headrest can be releasably maintained in, and moved between, at least the first position of the impact element and the second position of the impact element.

28. A headrest according to claim 1, wherein:
the crash position of the impact element can be either of at least a first position of the impact element and a second position of the impact element,
the first position of the impact element is rearward of the second position of the impact element,
the crash lock is operative for restricting the impact element from moving from the first position of the impact element toward the original position of the impact element, and
the crash lock is also operative for restricting the impact element from moving from the second position of the impact element toward the original position of the impact element.

29. A headrest according to claim 1, wherein the crash lock is further for being selectively unlocked while the impact element is in the crash position, so that the impact element can be moved from the crash position to the original position, and the headrest further comprises a pawl mounted for pivoting between first and second positions, wherein the pawl is at least substantially unloaded while the impact element is in the crash position, and the pawl is operative for:

holding a restraint element of the impact element and thereby maintaining the impact element in the original position, while the pawl is in the pawl's first position and prior to the crash, releasing the restraint element in response to the crash, so that the energy storage device can drive the linkage so that the impact element moves from the original position to the crash position, and receiving the restraint element and then releasably holding the restraint element so as to maintain the impact element in the original position, in response to the impact element being moved from the crash position to the original position.

30. A headrest according to claim 29, wherein the pawl has a chamfer for bearing against the restraint element for a predetermined period that occurs while the impact element is being moved from the crash position to the original position.

31. A headrest according to claim 29, wherein the pawl has a pawl jaw with a lip for bearing against the restraint element for a predetermined period that occurs while the impact element is being moved from the crash position to the original position.

32. A headrest according to claim 29, wherein a substantial portion of the restraint element is fitted into an other part of the impact element.

33. A headrest according to claim 32, wherein the other part of the impact element includes a receptacle that is closed with a lid, and the restraint element includes a crooked middle section that is at least partially fitted into the receptacle and engaged by the pawl.

34. A headrest according to claim 33, wherein the energy storage device directly bears on the restraint element.

35. A headrest according to claim 29, wherein the energy storage device directly bears on the restraint element.

36. A headrest that is for a vehicle seat and operates advantageously in the event of a crash, the headrest comprising:
   at least a four-bar linkage including
      (a) upper and lower linkages mounted for pivoting relative to a carrier, wherein the upper and lower linkages being mounted for pivoting relative to the carrier comprises
         (1) the upper linkage being pivotably connected to the carrier at a position. and
         (2) the lower linkage being pivotably connected to the carrier at a position that is distant from the position where the upper linkage is pivotably connected to the carrier, and
      (b) an impact element that is operatively connected to the upper and lower linkages for moving away from the carrier in an at least generally forward direction, from an original position to a crash position, in response to pivoting of the upper and lower linkages relative to the carrier, wherein the impact element being operatively connected to the upper and lower linkages for moving away from the carrier in the at least generally forward direction, from the original position to the crash position, in response to pivoting of the upper and lower linkages relative to the carrier, comprises
         (1) the impact element being pivotably connected to the upper linkage at a position that is distant from the position where the upper linkage is pivotably connected to the carrier, and
         (2) the impact element being pivotably connected to the lower linkage at a position that is distant from both
            (i) the position where the lower linkage is pivotably connected to the carrier, and
            (ii) the position where the impact element is pivotably connected to the upper linkage;
   an energy storage device for driving the linkage so that the impact element moves from the original position to the crash position in response to the crash; and
   a crash lock for restricting the impact element from moving from the crash position toward the original position,
   wherein the crash lock is operative for being unlocked, in a predetermined manner, while the impact element is in the crash position, so that the impact element can be moved from the crash position to the original position, whereby the impact element is reset to the original position.

37. A headrest according to claim 36, further comprising a resetting device that is operative, while the impact element is in the crash position, for unlocking the crash lock so that the impact element can be moved to the original position.

38. A headrest that is for a vehicle seat and operates advantageously in the event of a crash, the headrest comprising:
   at least a four-bar linkage including upper and lower linkages mounted for pivoting relative to a carrier, and an impact element that is operatively connected to the upper and lower linkages for moving away from the carrier in an at least generally forward direction, from an original position to a crash position, in response to pivoting of the upper and lower linkages relative to the carrier;
   an energy storage device for driving the linkage so that the impact element moves from the original position to the crash position in response to the crash, wherein the energy storage device is a spring, the spring is in a first configuration while the impact element is in the original position, the spring is in a second configuration while the impact element is in the crash position;
   a crash lock for restricting the impact element from moving from the crash position toward the original position; and
   a pawl mounted for pivoting between first and second positions, wherein the pawl at least indirectly releasably holds the spring in the spring's first configuration while the pawl is in the pawl's first position.

39. A headrest according to claim 38, further comprising a movably mounted holding element for releasably holding the pawl in the pawl's first position, and a control lever that is operatively connected to the carrier so that the control lever is operative in response to the crash to move the holding element so that the holding element releases the pawl, so that the pawl can move to the pawl's second position.

40. A headrest according to claim 38, wherein:
   (a) the upper and lower linkages being mounted for pivoting relative to the carrier comprises
      (1) the upper linkage being pivotably connected to the carrier at a position, and
      (2) the lower linkage being pivotably connected to the carrier at a position that is distant from the position where the upper linkage is pivotably connected to the carrier; and
   (b) the impact element being operatively connected to the upper and lower linkages for moving away from the carrier in the at least generally forward direction, from the original position to the crash position, in response to pivoting of the upper and lower linkages relative to the carrier, comprises
   (1) the impact element being pivotably connected to the upper linkage at a position that is distant from the position where the upper linkage is pivotably connected to the carrier, and
   (2) the impact element being pivotably connected to the lower linkage at a position that is distant from both
     (i) the position where the lower linkage is pivotably connected to the carrier, and
     (ii) the position where the impact element is pivotably connected to the upper linkage.

41. A headrest that is for a vehicle seat and operates advantageously in the event of a crash, the headrest comprising:
at least a four-bar linkage including upper and lower linkages mounted for pivoting relative to a carrier, and an impact element that is operatively connected to the upper and lower linkages for moving away from the carrier in an at least generally forward direction, from an original position to a crash position, in response to pivoting of the upper and lower linkages relative to the carrier;
an energy storage device for driving the linkage so that the impact element moves from the original position to the crash position in response to the crash;
a crash lock for:
   restricting the impact element from moving from the crash position toward the original position, and
   being selectively unlocked while the impact element is in the crash position, so that the impact element can be moved from the crash position to the original position; and
a pawl mounted for pivoting between first and second positions, wherein the pawl is at least substantially unloaded while the impact element is in the crash position, and the pawl is operative for:
   holding a restraint element of the impact element and thereby maintaining the impact element in the original position, while the pawl is in the pawl's first position and prior to the crash,
   releasing the restraint element in response to the crash, so that the energy storage device drives the linkage so that the impact element moves from the original position to the crash position, and
   receiving the restraint element and then releasably holding the restraint element so as to releasably maintain the impact element in the original position, in response to the impact element being moved from the crash position to the original position.

42. A headrest according to claim 41, wherein the pawl has a chamfer for bearing against the restraint element for a predetermined period that occurs while the impact element is being moved from the crash position to the original position.

43. A headrest according to claim 41, wherein the pawl has a pawl jaw with a lip for bearing against the restraint element for a predetermined period that occurs while the impact element is being moved from the crash position to the original position.

44. A headrest according to claim 41, wherein a substantial portion of the restraint element is fitted into an other part of the impact element.

45. A headrest according to claim 41, wherein:
(a) the upper and lower linkages being mounted for pivoting relative to the carrier comprises
   (1) the upper linkage being pivotably connected to the carrier at a position, and
   (2) the lower linkage being pivotably connected to the carrier at a position that is distant from the position where the upper linkage is pivotably connected to the carrier; and
(b) the impact element being operatively connected to the upper and lower linkages for moving away from the carrier in the at least generally forward direction, from the original position to the crash position, in response to pivoting of the upper and lower linkages relative to the carrier, comprises
   (1) the impact element being pivotably connected to the upper linkage at a position that is distant from the position where the upper linkage is pivotably connected to the carrier, and
   (2) the impact element being pivotably connected to the lower linkage at a position that is distant from both
     (i) the position where the lower linkage is pivotably connected to the carrier, and
     (ii) the position where the impact element is pivotably connected to the upper linkage.

46. A headrest that is for a vehicle seat and operates advantageously in the event of a crash, the headrest comprising:
at least a four-bar linkage including
   (a) upper and lower linkages mounted for pivoting relative to a carrier, wherein the upper and lower linkages being mounted for pivoting relative to the carrier comprises
     (1) the upper linkage being pivotably connected to the carrier at a position, and
     (2) the lower linkage being pivotably connected to the carrier at a position that is distant from the position where the upper linkage is pivotably connected to the carrier, and
   (b) an impact element that is operatively connected to the upper and lower linkages for moving away from the carrier in an at least generally forward direction, from an original position to a crash position, in response to pivoting of the upper and lower linkages relative to the carrier, wherein the impact element being operatively connected to the upper and lower linkages for moving away from the carrier in the at least generally forward direction, from the original position to the crash position, in response to pivoting of the upper and lower linkages relative to the carrier, comprises
     (1) the impact element being pivotably connected to the upper linkage at a position that is distant from the position where the upper linkage is pivotably connected to the carrier, and
     (2) the impact element being pivotably connected to the lower linkage at a position that is distant from both
       (i) the position where the lower linkage is pivotably connected to the carrier, and
       (ii) the position where the impact element is pivotably connected to the upper linkage; and
a crash lock for restricting the impact element from moving from the crash position toward the original position,
wherein the upper and lower linkages are unparallel with respect to one another.

47. A headrest according to claim 46, wherein the lower linkage's length and the upper linkage's length are different.

48. A headrest according to claim 47, wherein the lower linkage's length is greater than the upper linkage's length.

49. A headrest according to claim 46, wherein the crash lock is operative for being unlocked, in a predetermined manner, while the impact element is in the crash position, so that the impact element can be moved from the crash position to the original position, whereby the impact element is reset to the original position.

50. A headrest according to claim 49, further comprising a resetting device that is operative, while the impact element is in the crash position, for unlocking the crash lock so that the impact element can be moved to the original position.

51. A headrest according to claim 46, wherein:
the original position of the impact element can be either of at least a first position of the impact element and a second position of the impact element,
the first position of the impact element is rearward of the second position of the impact element,
the first position of the impact element is rearward of the crash position of the impact element, whereby the first position of the impact element is comfortable for a user of the vehicle seat,
the second position of the impact element is rearward of the crash position of the impact element, whereby the second position of the impact element is comfortable for a user of the vehicle seat, and
the headrest can be releasably maintained in, and moved between, at least the first position of the impact element and the second position of the impact element.

52. A headrest according to claim 46, wherein:
the crash position of the impact element can be either of at least a first position of the impact element and a second position of the impact element,
the first position of the impact element is rearward of the second position of the impact element,
the crash lock is operative for restricting the impact element from moving from the first position of the impact element toward the original position of the impact element, and
the crash lock is also operative for restricting the impact element from moving from the second position of the impact element toward the original position of the impact element.

53. A headrest according to claim 46, wherein an energy storage device drives the linkage so that the impact element moves from the original position to the crash position in response to the crash.

54. A headrest according to claim 53, wherein:
a pawl at least indirectly restrains the energy storage device prior to the crash, and
the pawl at least indirectly releases the energy storage device in response to the crash.

* * * * *